US012443938B2

(12) United States Patent
Johnson et al.

(10) Patent No.: US 12,443,938 B2
(45) Date of Patent: *Oct. 14, 2025

(54) POINT-OF-SALE (POS) OPERATION SYSTEM

(71) Applicant: Toshiba Global Commerce Solutions Holdings Corporation, Tokyo (JP)

(72) Inventors: Brad M. Johnson, Raleigh, NC (US); Robert Andrew Myers, Cary, NC (US); Scott Graham, Oxford, NC (US); William Laird Dungan, Cary, NC (US); Timothy W. Crockett, Raleigh, NC (US)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 466 days.

This patent is subject to a terminal disclaimer.

(21) Appl. No.: 17/855,056

(22) Filed: Jun. 30, 2022

(65) Prior Publication Data

US 2022/0351172 A1 Nov. 3, 2022

Related U.S. Application Data

(62) Division of application No. 16/670,434, filed on Oct. 31, 2019, now Pat. No. 11,386,411.

(51) Int. Cl.
*G06Q 20/20* (2012.01)
*G08B 5/36* (2006.01)
*H04L 67/12* (2022.01)

(52) U.S. Cl.
CPC ............ *G06Q 20/208* (2013.01); *G08B 5/36* (2013.01); *H04L 67/12* (2013.01)

(58) Field of Classification Search
CPC .... G06Q 20/208; G06Q 20/202; G06Q 20/18; G08B 5/36; G08B 5/38; H04L 67/12; G07G 1/01
See application file for complete search history.

(56) References Cited

U.S. PATENT DOCUMENTS

| | | | |
|---|---|---|---|
| 7,066,389 | B2 | 6/2006 | Dickover et al. |
| 7,204,346 | B2 | 4/2007 | Kurtz et al. |
| 7,575,162 | B1 | 8/2009 | Malchak et al. |
| 7,673,796 | B2 | 3/2010 | Kobres et al. |
| 8,876,001 | B2 | 11/2014 | Herwig et al. |
| 9,033,227 | B2 | 5/2015 | Kobres |
| 9,563,886 | B1 | 2/2017 | Catoe et al. |
| 10,694,872 | B2 | 6/2020 | Patil et al. |
| 10,776,844 | B2 | 9/2020 | Herring et al. |
| 10,853,856 | B2 | 12/2020 | Kundu et al. |

(Continued)

FOREIGN PATENT DOCUMENTS

CN 109727544 A * 5/2019

*Primary Examiner* — Michael Jared Walker
*Assistant Examiner* — Matthew S Weronski
(74) *Attorney, Agent, or Firm* — COATS & BENNETT, PLLC (57) ABSTRACT

A self-checkout (SCO) terminal in a retail store controls banks of lights to communicate context information to a customer in order to better inform them about various events. The context information may be related to a predetermined event, such as a self-checkout process or an emergency event, and is enhanced using the personal preferences of the customer using the SCO terminal.

10 Claims, 8 Drawing Sheets

(56) References Cited

U.S. PATENT DOCUMENTS

| | | |
|---|---|---|
| 2002/0111917 A1 | 8/2002 | Hoffman et al. |
| 2005/0216354 A1 | 9/2005 | Bam et al. |
| 2010/0135584 A1 | 6/2010 | Tang et al. |
| 2014/0330729 A1 | 11/2014 | Colangelo |
| 2015/0127401 A1* | 5/2015 | Hogg ................. G06Q 30/0281 |
| | | 705/7.15 |
| 2018/0144821 A1* | 5/2018 | Irani-Cohen ....... G06Q 30/0631 |
| 2020/0184439 A1 | 6/2020 | Watson et al. |
| 2020/0286058 A1 | 9/2020 | Edwards et al. |
| 2021/0073782 A1 | 3/2021 | Cash et al. |
| 2021/0133715 A1 | 5/2021 | Johnson et al. |

* cited by examiner

PROCESSING CIRCUITRY
112

COMMUNICATION UNIT/MODULE
130

CONTEXT DETERMINATION UNIT/MODULE
132

CUSTOMER PREFERENCE INFORMATION DETERMINATION UNIT/MODULE
134

CONTROL SIGNAL GENERATOR UNIT/MODULE
136

LIGHT ELEMENT CONTROL UNIT/MODULE
138

FIG. 11

POINT-OF-SALE (POS) OPERATION SYSTEM

RELATED APPLICATIONS

This application is a divisional application of U.S. application Ser. No. 16/670,434 filed Oct. 31, 2019, the entirety of which is incorporated herein by reference.

TECHNICAL FIELD

The present disclosure relates generally to point-of-sale (POS) systems, and more particularly to self-checkout (SCO) systems configured to convey context information to users in a retail store.

BACKGROUND

Many retailers utilize self-checkout (SCO) stations as an alternative to conventional attendant-assisted checkout lanes. As is known in the art, SCO stations allow customers to process their own purchases. Particularly, customers use a SCO station to scan, and sometimes weigh, the items they would like to purchase before placing the items in a bagging area. Once all items have been scanned, customers utilize the SCO station to apply payment.

SCO stations are generally very beneficial for retailers. For example, because customers perform their own checkout process, retailers require fewer cashiers. In some situations, a store employee is needed to assist customers; however, a single attendant can manage multiple SCO stations. Structurally, SCO stations also have much smaller footprints than their full-service station counterparts, thereby saving floor space that can be utilized for other purposes such as product display and additional checkout stations. Additionally, SCO stations are convenient for the customer and often times faster than checking our through a full-service checkout lane.

On the other hand, SCO stations have been criticized because they reduce the interactions between customers and store employees. This can be particularly frustrating for customers who experience technical difficulties while performing a self-checkout process. For example, SCO stations may not adequately describe the reason for an error to a customer, such as why the customer's payment or coupons are being declined. Additionally, many SCOs are not entirely clear as to the various stages of the checkout process. To explain and/or correct such errors, the attendant must usually become involved. And while the attendant can correct the technical issues for the customer, he or she are often times unable to explain the fault and/or the reasons for the fault to the customer.

DETAILED DESCRIPTION

Embodiments of the present disclosure provide a computer, a method, and a corresponding non-transitory, computer-readable storage medium for operating a self-checkout (SCO) station in a retail store. More particularly, embodiments of the present disclosure configure an SCO station to communicate context information to a user of the SCO station in order to better inform the user as to a variety of events. The context information may be related to a predetermined event, such as when the various stages of a self-checkout process begin and/or what actions a customer is to perform during those stages. Additionally, or alternatively, the context information may be related to dynamically occurring events, such as an emergency situation occurring within or near the retail store. Regardless of the particular situation, however, an SCO station configured according to the present embodiments communicates information about those events to the user of the SCO station.

Figure 1:
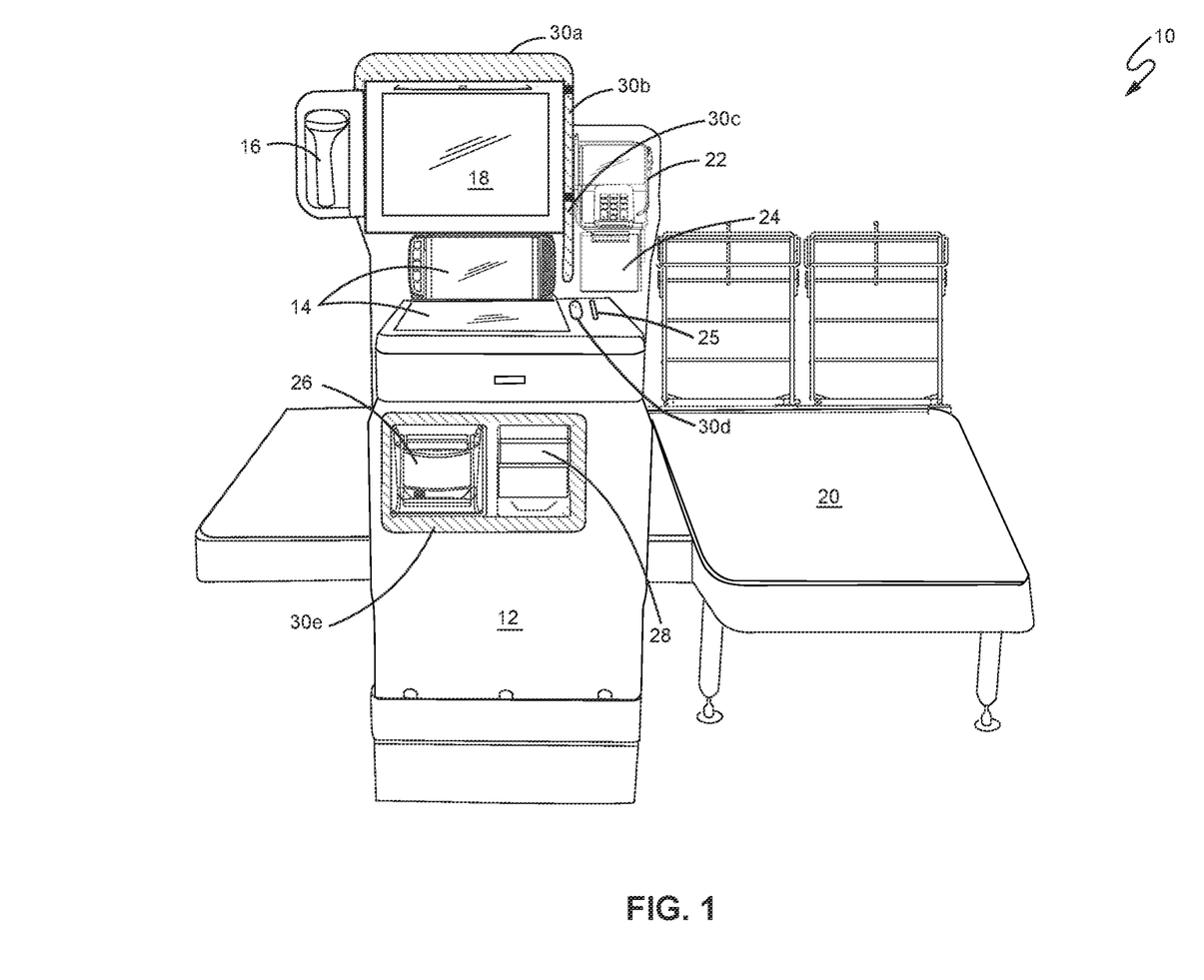
FIG. 1 is a perspective view illustrating a self-checkout (SCO) station configured according to one embodiment of the present disclosure.

Turning now to the drawings, FIG. 1 illustrates an SCO station 10 configured according to one embodiment of the present disclosure. As seen in FIG. 1, SCO station 10 is a cash-based system that is able to accept cash and/or credit cards as a payment vehicle for items purchased by a customer, as well as to distribute cash to a customer as change. However, those of ordinary skill in the art should readily appreciate that the present embodiments are not so limited. In other embodiments, which are seen in more detail later, an SCO station 10 configured according to the present disclosure may be a "cashless" system (e.g., a kiosk that does not accept or distribute cash from/to a customer, but rather, processes only credit cards, gift cards, Automatic Clearing House (ACH) transactions, and similar payment vehicles presented by the customer as payment for the items).

As seen in FIG. 1, SCO station 10 comprises a housing 12, one or more optical scanners 14, 16, a display device 18, a receiving area 20, a payment processing unit 22, a printer 24, a coupon slot 25, a cash acceptor 26, and a change interface 28. In addition, according to the present disclosure, SCO station 10 is configured to include a plurality of light elements 30a, 30b, 30c, 30d, and 30e (collectively "light elements 30").

The housing 12 comprises a cabinet that contains a computer 110 configured to control the operations and functions of SCO station 10. In addition, although not explicitly shown herein, the housing 12 also contains the cabling and other functional components that communicatively connect SCO station 10 to a computer network and one or more other remote computing devices. Such devices may include, for example, one or more server devices that may or may not be located in the retail store.

Scanners 14, 16 are optical scanners configured to scan bar codes printed on the items that a customer wishes to purchase. Scanner 16 is, in particular, a hand-held scanner that the customer can remove from its dock to scan larger items without having remove them from his/her cart. In some situations, items being purchased by a customer do not have a bar code. In these cases, scanner 14 may be configured to perform a dual scanner/scale function to allow the customer to scan and/or weigh an item he/she wishes to purchase.

The display 18 is configured to display information associated with the items being purchased to the customer, and the receiving area 20 comprises a platform that receives items scanned and/or weighed by the customer. The payment processing unit 22 comprises a pinpad configured to accept a customer's non-cash payment vehicle (e.g., inserting or swiping a credit card or debit card), while the printer 24 is configured to print receipts and/or coupons for the customer, as is known in the art. The coupon slot 25 comprises a generally elongated slot configured to receive coupons being redeemed by the customer. The cash acceptor 26 receives cash (i.e., paper money and/or coins) from the customer for the items being purchased by the customer, while the change interface 28 provides change to the customer in the form of paper money and/or coins.

In addition to these components, an SCO station 10 configured according to the present embodiments also comprises a plurality of light elements 30. In the embodiment of FIG. 1, light elements 30 are partitioned into independent banks of light elements 30a, 30b, 30c, 30d, and 30e. Each light element 30a, 30b, 30c, 30d, and 30e is independently controllable and comprises one or more individually addressable Light Emitting Diodes (LEDs). The LEDs comprising each of the light elements 30 are individually configurable with respect to being turned on or off, their color, their intensity, and timing. In some embodiments, each of the light elements 30 are controlled so as to animate one or more of the light elements 30. Control of the light elements 30 may be accomplished using, for example, software scripts that execute on computer 110 contained in the housing of SCO station 10.

In this embodiment, each individual bank of light elements 30a, 30b, 30c, 30d, and 30e are associated with a predetermined component on SCO station 10. Further, each light element 30a, 30b, 30c, 30d, and 30e is individually and collectively controllable to indicate certain context information to the customer. For example, in this embodiment, light element 30a is a "lane" light indicating whether the SCO station 10 is in an "OPEN" state or a "CLOSED" state. In the OPEN state, SCO station 10 is in an operational mode to allow customers to perform a self-checkout process. In the CLOSED state, SCO station 10 is in a non-operational mode and cannot be used by a customer to perform a self-checkout process. Light element 30b is a "pinpad" light that indicates the position of the payment processing unit 22 on SCO station 10, as well as when a customer can begin utilizing the payment processing unit 22 to provide payment for the scanned items. Light element 30c is a "printer" light that indicates the position of the printer 24 on SCO station 10, as well as when printer 24 is printing a receipt and/or a coupon to use on a future visit. Light element 30d is a "coupon slot" light that indicates when and where the customer can insert coupons being redeemed into coupon slot 25. Light element 30e is a "cash interface" light that is controlled to indicate when the customer should input cash and/or change into the cash acceptor 26, as well as when the customer can remove any change due to him/her from the change interface 28.

In operation, the light elements 30 are controlled according to the context information they are to convey to a customer. For example, in one embodiment, each light 30a, 30b, 30c, 30d, and 30 is individually enabled and disabled by computer 110 to indicate the stages of the self-checkout process to the customer. Thus, upon viewing and enabled light element 30a, indicating that the SCO station is in an OPEN state, the customer would approach the SCO station 10 and begin scanning the items they wish to purchase. Once all items have been scanned, light element 30b would be enabled to indicate to the customer that he/she can insert a credit card or similar payment vehicle to pay for the items, while light element 30e would be enabled to indicate that the customer could alternatively input cash into the cash acceptor 26 as payment for the items being purchased. Light element 30d would be enabled to indicate when and where the customer can insert any coupons being redeemed. After payment has been accepted, light element 30c would be enabled to indicate that printer 24 is printing a receipt and/or one or more coupons. In situations where a customer used cash to pay for the items, or where the customer is receiving cash back from SCO station 10, light element 30e would again be enabled to indicate to the customer that they are to retrieve money from the change interface 28.

According to the present embodiments, there are a variety of ways to control the light elements 30 to convey context information to the customer. For example, the LEDs in each light element 30, individually and/or collectively, may be controlled to blink according to a desired timing. Such control may be exercised on each LED individually and/or together with one or more LEDs. In at least one embodiment, the LEDs that comprise each light element 30a, 30b, 30c, 30d, and 30e is individually and/or collectively controllable so as to animate one or more of the light elements 30. Further, the times during which one or more of the light elements 30 are enabled may overlap. Thus, according to the present disclosure, one of the light elements 30 (e.g., light element 30a) may remain enabled throughout the entire checkout process while one or more of the remaining light elements 30 (e.g., light elements 30b, 30c, 30d, and 30e) are enabled/disabled at various times throughout the self-checkout process.

Additionally, the present embodiments also allow for other types of control of the light elements 30. By way of example only, the color, the intensity, and the color temperature of one or more LEDs in the light elements 30, as well as the timing in which one or more LEDs in light elements 30 are enabled and disabled, are all controllable according to the present embodiments in order to convey the context information to a customer using SCO station 10. For example, in one embodiment, control of the LEDs in each of the light elements 30 is synchronized to video being displayed on display device 18. This embodiment may be especially beneficial for displaying tutorials or help information to a customer learning how to use SCO station 10.

Figure 2:
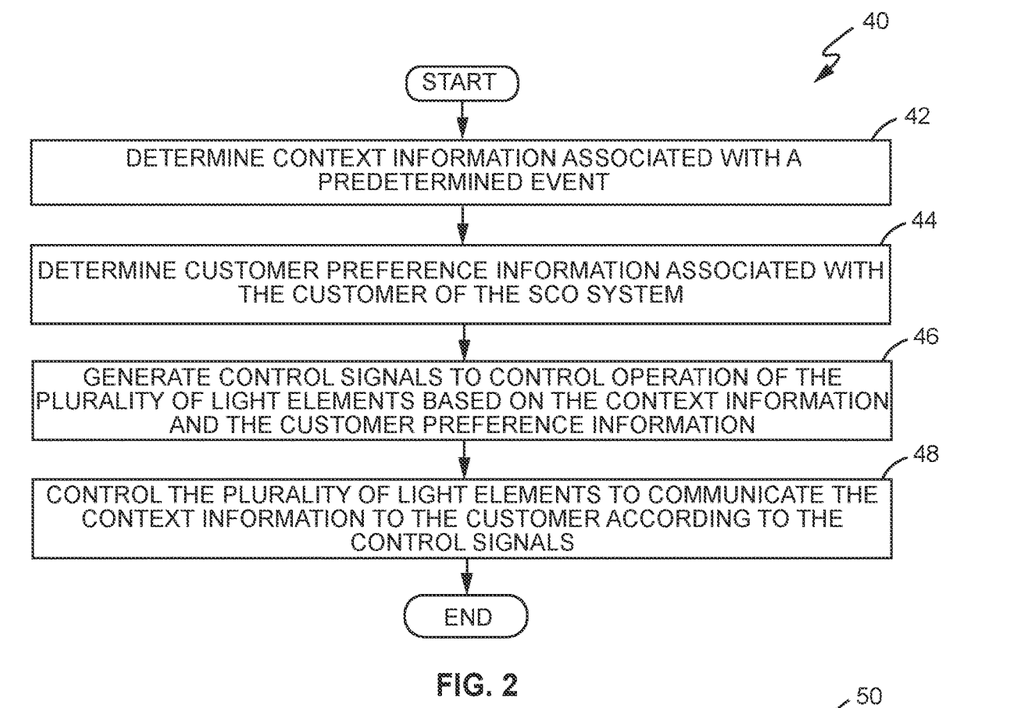
FIGS. 2-7 are flow diagrams illustrating corresponding methods for communicating context information to a user of an SCO station in a retail store according to embodiments of the present disclosure.

In other embodiments, such as the embodiment of method 40 of FIG. 2, one or more of the LEDs in one or more of the light elements 30 may be further controllable according to the preferences of a customer. In these embodiments, a customer would have pre-provisioned a data record with a set of his/her preferences, such as preferred color(s), intensity, etc. The data would then be stored in a database associated with the retailer and accessible to SCO station 10. Such information may be provided by the customer, for example, in connection with obtaining a loyalty card for the store.

As seen in FIG. 2, method 40 begins with SCO station 10 determining the context information that is associated with a predetermined event, such as the beginning of a self-checkout process (box 42). In one embodiment, for example, a proximity sensor associated with SCO station 10 is configured to detect a customer as he/she approaches SCO station 10. The resultant signals generated by the proximity sensor would then trigger SCO station 10 to determine the context information associated with starting a self-checkout process. In addition, the SCO station 10 would also determine the customer's preference information by obtaining the customer's data record, for example, from the database (box 44). Based on both the determined context information (e.g., the information associated with the start of a self-checkout transaction) and the customer's preference information, SCO station 10 generates the one or more control signals needed to control the operation of one or more of the light elements 30 (box 46), and then controls the light elements 30 according to those control signals (box 48).

Figure 3:
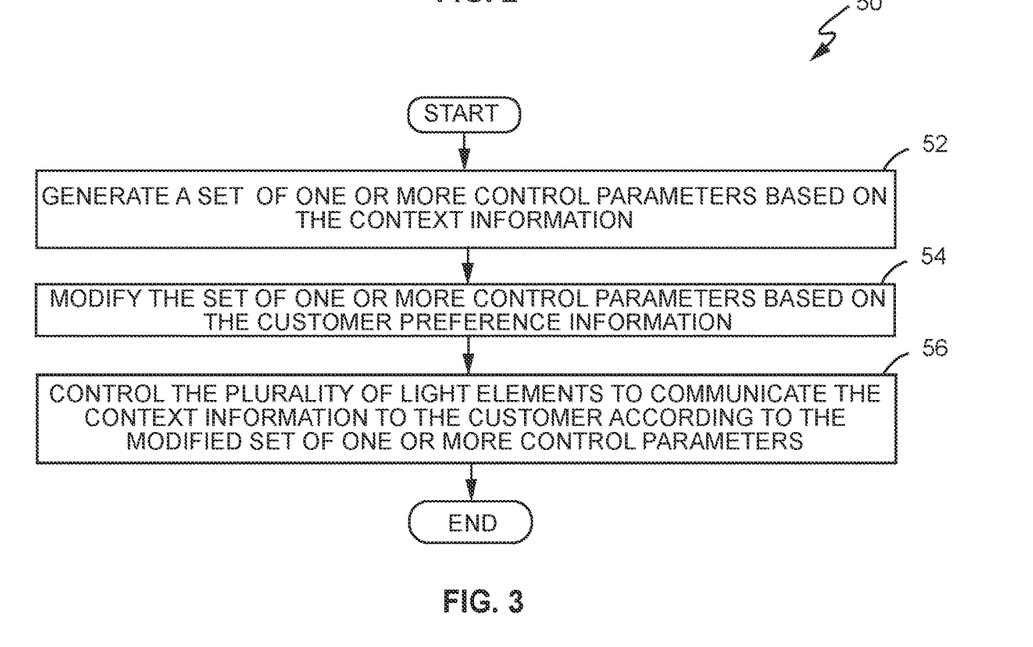

For example, as seen in method 50 of FIG. 3, the control signals comprise a software script generated or obtained by SCO station 10. In these embodiments, SCO station 10 may generate or obtain a set of one or more control parameters based on the context information to be conveyed to the customer, such as information on how to proceed through the self-checkout process, for example (box 52). The control parameters may identify, for example, which LEDs to enable and/or disable, when to enable/disable those LEDs, the color, intensity, and/or color temperature those LEDs, and the like. SCO station 10 would then modify some or all of those control parameters based on the customer's preference information (box 54). For example, SCO station 10 may modify the control parameters related to color to ensure that the LEDs are enabled according to the colors of the customer's alma mater. SCO station 10 then modifies the software script to include the modified control parameters, and executes the software script to control the plurality of light elements 30 and thereby communicate the context information according to the modified control parameters (box 56).

Those of ordinary skill in the art should appreciate that the embodiments of the present disclosure are not limited to the generation and use of software scripts to control the light elements 30. In another embodiment, SCO station 10 generates one or more electrical signals according to the context information and the customer preference information (boxes 52, 54), and controls the LEDs in light elements 30 by directly sending the electrical signals to the appropriate LEDs in the appropriate light elements 30 at the appropriate times (box 56).

Figure 4:
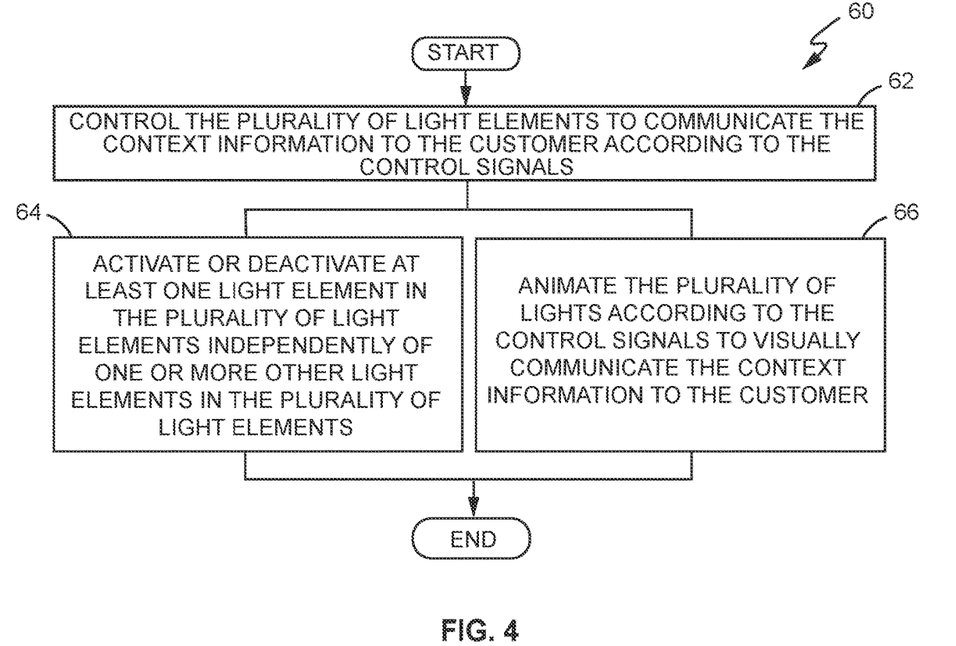

Regardless of whether SCO station 10 controls the light elements 30 by generating and executing a software script or by directly sending electrical control signals to the LEDs in light elements 30, however, there are a number of different ways that SCO station 10 can effect such control to clearly communicate the context information. For example, FIG. 4 is flow diagram illustrating a method 60 for controlling the plurality of light elements 30. As seen in FIG. 4, SCO station 10 controls the plurality of light elements 30. In one embodiment, the control signals (e.g., the software script, the electrical signals) activate and deactivate at least one light element 30 independently of one or more other light elements 30 (box 64). In another embodiment, SCO station 10 animates one or more of the light elements 30 (box 66).

Such embodiments could control the light elements 30 to indicate the locations of one or more particular components of SCO station 10 to the customer, and guide the customer along the different stages of the self-checkout process. Thus, the light element 30b associated with the payment processing unit 22 may only be activated when it is time for the customer to render payment for his/her selected items. In another example, light element 30e may be activated only when there is change for the customer. Light elements 30c, 30d may be activated, respectively, only during the times that printer 24 is printing a receipt or a coupon, and when the customer can insert a redeemed coupon into the coupon slot 25. For cash-based transactions, if the customer begins to walk away from the SCO station without taking his/her change, light element 30e may begin blinking in any desired pattern, for example, in the same color/time interval and/or in a different color/time interval, to communicate to the customer that he/she forgot to take their change.

In another embodiment of the present disclosure, SCO station 10 is configured to control light elements 30 based on a known medical issue associated with the customer. By way of example only, consider a customer who has epilepsy or autism, or who has a child with epilepsy or autism. In these cases, animating light elements 30 and/or causing them to blink at a specified frequency could be harmful to the customer or their child by triggering a seizure. Therefore, the present embodiments can modify control of the light elements 30 based on this knowledge to prevent triggering a seizure.

Figure 5:
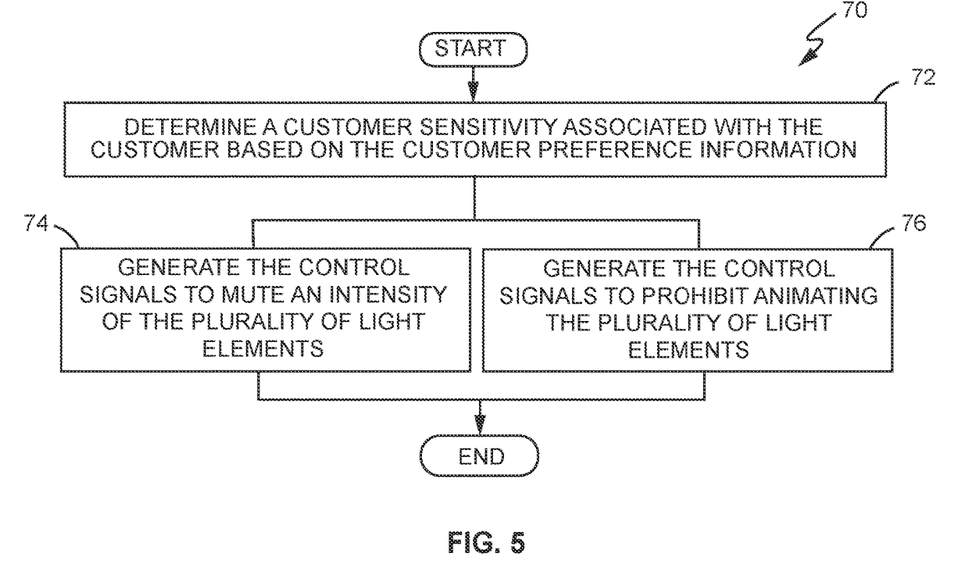

FIG. 5 is a flow diagram illustrating a method 70 for controlling light elements 30 based on the knowledge that a customer, or a person (such as a child) that may accompany the customer, has a medical condition that might be exacerbated by the controlled activity of light elements 30. In this embodiment, method 70 begins with SCO station 10 determining a sensitivity (e.g., a medical condition) associated with the customer (box 72). The particular sensitivity may be determined, for example, based on the customer's preference information stored in the database accessible to SCO station 10. So determined, SCO station 10 modifies the control signals (e.g., the control parameters to be used in the executed software script or the electrical signals sent to the light elements 30) to mute the intensity of light elements 30 (box 74), or to prohibit the animation of light elements 30 (box 76). In other examples, SCO station 10 may be configured to allow such animation and/or blinking, but at a modified frequency and/or a muted intensity.

Figure 6:
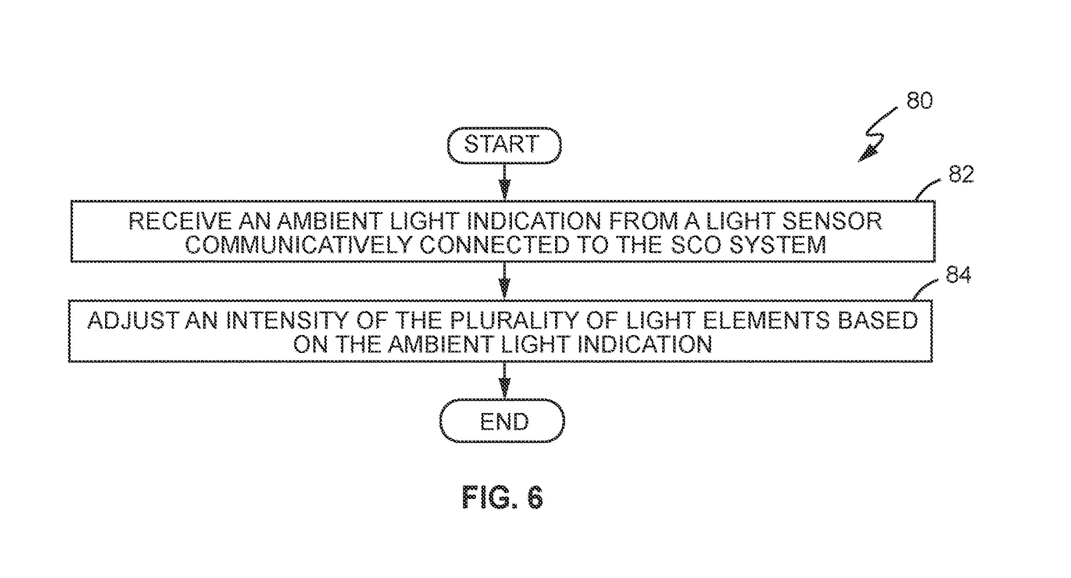

FIG. 6 is a flow diagram illustrating a method 80 for modifying the operation of the light elements 30 according to other environmental factors, such as the amount of ambient light. In this embodiment, a sensor associated with SCO station 10 may periodically measure the ambient light around the SCO station 10 and send a light indication signal to the SCO station 10 (box 82). So informed, SCO station 10 can generate the control signals needed to adjust the intensity of the light elements 30 (box 84). For example, SCO station 10 may increase the intensity of light elements 30 when the ambient light is brighter, and decrease the intensity of the light elements 30 when the ambient light is less bright. Such control helps ensure that the light elements 30 are clearly and easily visible to the customer, while at the same time, helps to maintain the life of the individual LEDs that comprise the light elements 30.

Figure 7:
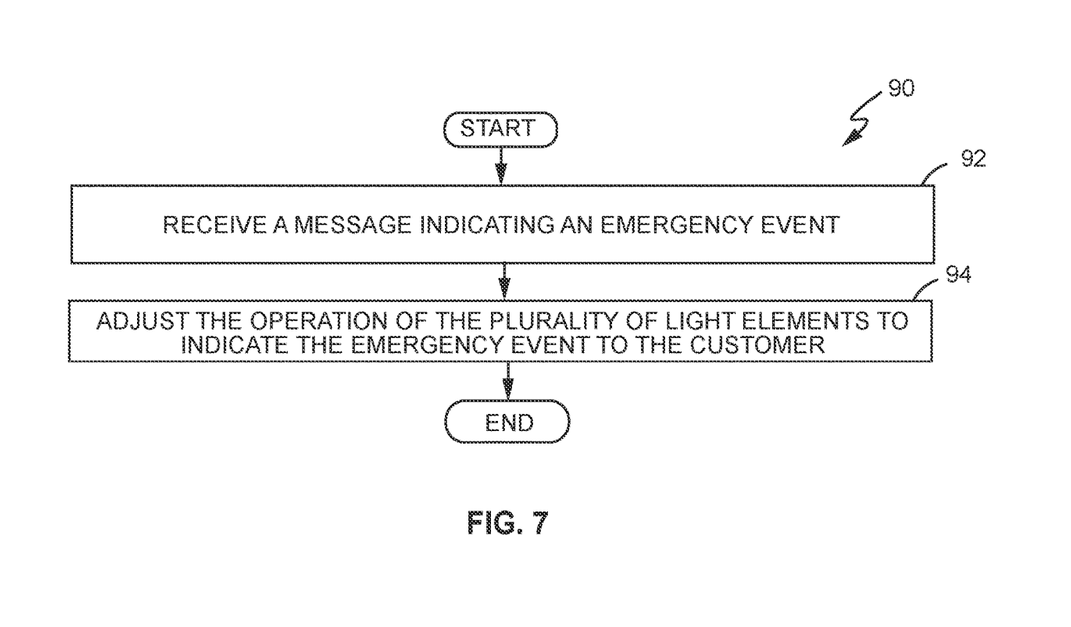

In addition to controlling the light elements 30 according to the context information to be conveyed and the customer preferences, embodiments of the present disclosure may also be controlled to convey information regarding the ambient environment to the customer. For example, consider a situation where a person is detected entering the rear of a retail store with a firearm, or where a person is detected abducting a child from within the store. Such events may be detected and reported by a store employee, for example, or by one or more security cameras installed at the store and linked to a system specially configured to detect abnormal human behavior. In cases such as these, the SCO station 10 could receive a message indicating the emergency event (box 92). Once informed, SCO station 10 could automatically switch its operating mode to an emergency mode of operation and control the light elements 30 to indicate the emergency to the customer (box 94). For example, SCO station 10 may control light elements 30 to change color to red and begin blinking at a predetermined frequency. Such control would be associated with control signals stored or identified in one or more files, for example, and would override any current control signals being used by SCO station 10.

Those of ordinary skill in the art should readily appreciate that this embodiment is not limited to emergency events within the retail store. Rather, control of the light elements 30 according to other emergency events is also possible. Such events include, but are not limited to, a fire in or near the store, an active shooter situation in a nearby vicinity of the retail store, and the like. Regardless of the particular emergency event, however, SCO station 10 is configured to override the control of a current light element 30, and begin controlling the one or more light elements 30 according to a predetermined emergency protocol.

In addition to the embodiments above, the present disclosure also allows for the control of the light elements 30 to communicate context information related to other types of events. For example, a given SCO station 10 may experience a technical error or fault. In these cases, SCO station 10 would modify the control signals for one or more light elements 30a, 30b, 30c, 30d, and 30e to clearly indicate that fault or error to the customer. In another embodiment, SCO station 10 is configured to control the light elements 30 based on the colors for a particular holiday. For example, light elements 30 may be controlled to operate in red and green colors for Christmas, or in black and orange for Halloween.

Figure 8:
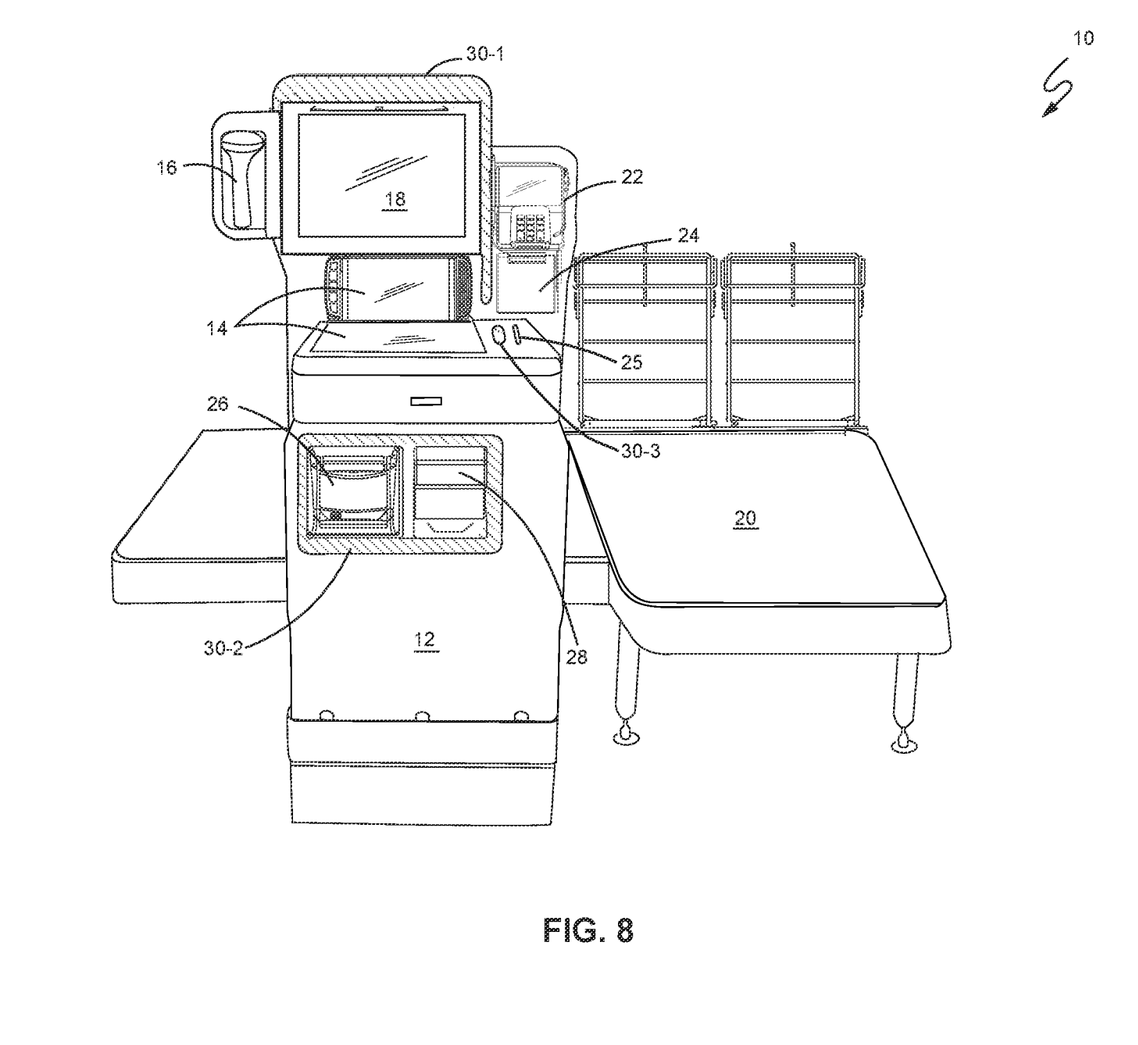
FIG. 8 is a perspective view illustrating an SCO station configured according to another embodiment of the present disclosure.

In the previous embodiments, the light elements 30 are illustrated as a plurality of independently controlled banks of light elements 30a, 30b, 30c, 30d, and 30e. However, those of ordinary skill in the art should readily appreciate that the present disclosure is not so limited. In one embodiment, as seen in FIG. 8, an SCO station 10 configured according to the present disclosure comprises banks of a single light element 30-1, 30-2, and 30-3. As in the previous embodiments, the LEDs comprising the light elements 30-1, 30-2, and 30-3 are individually addressable. Therefore, to convey the impression that a single light element (e.g., light element 30-1) is instead a plurality of light elements 30a, 30b, and 30c, SCO station 10 is configured to control the LEDs according to their individual addresses within the light element 30-1.

Figure 9:
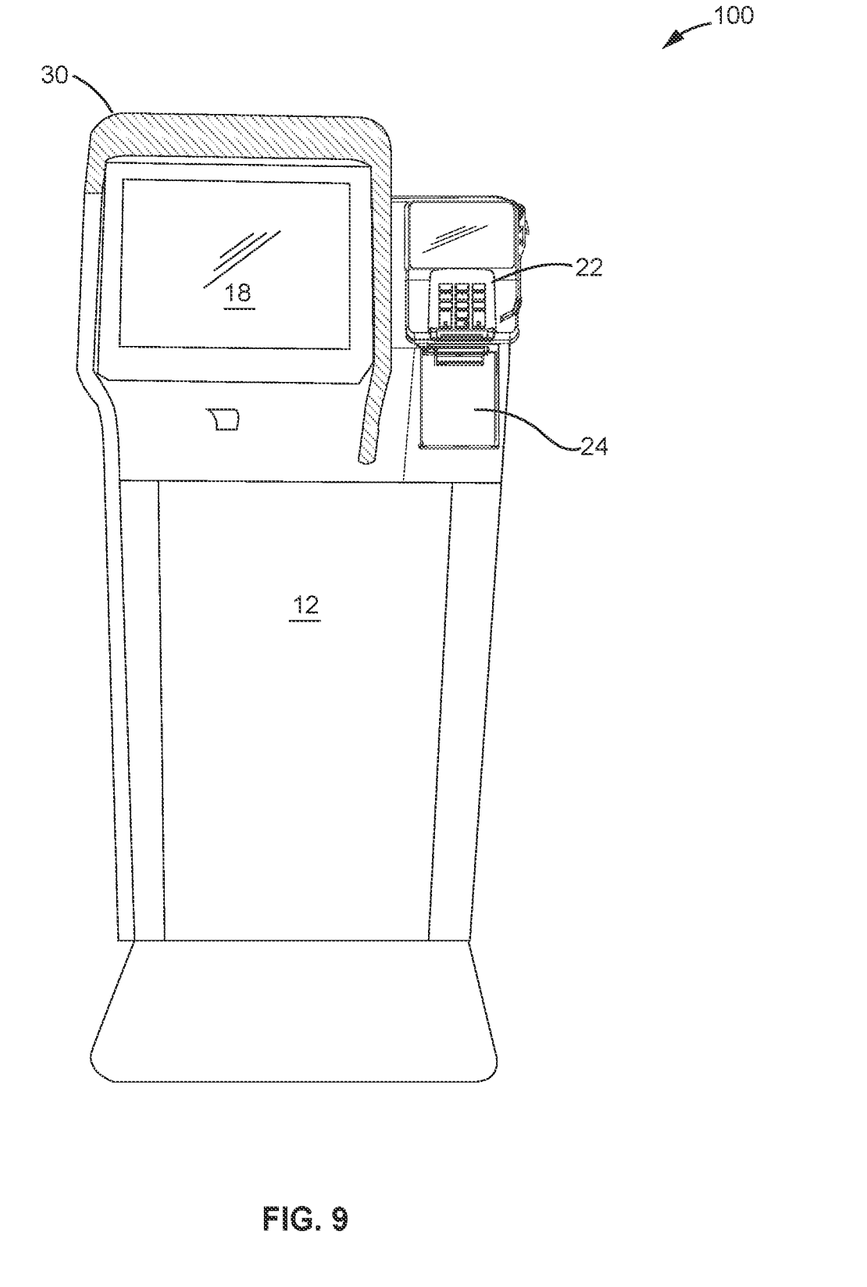
FIG. 9 is a perspective view illustrating an SCO station configured according to yet another embodiment of the present disclosure.

FIG. 9 illustrates another embodiment of the present disclosure in which the light element(s) 30 are associated with a cashless-based SCO kiosk 100. In this embodiment, light elements 30 are still controlled as previously described, and the computer 110 that controls the light elements may be located in the housing of SCO kiosk 110, or in a network to which SCO kiosk 110 is communicatively connected.

Figure 10:
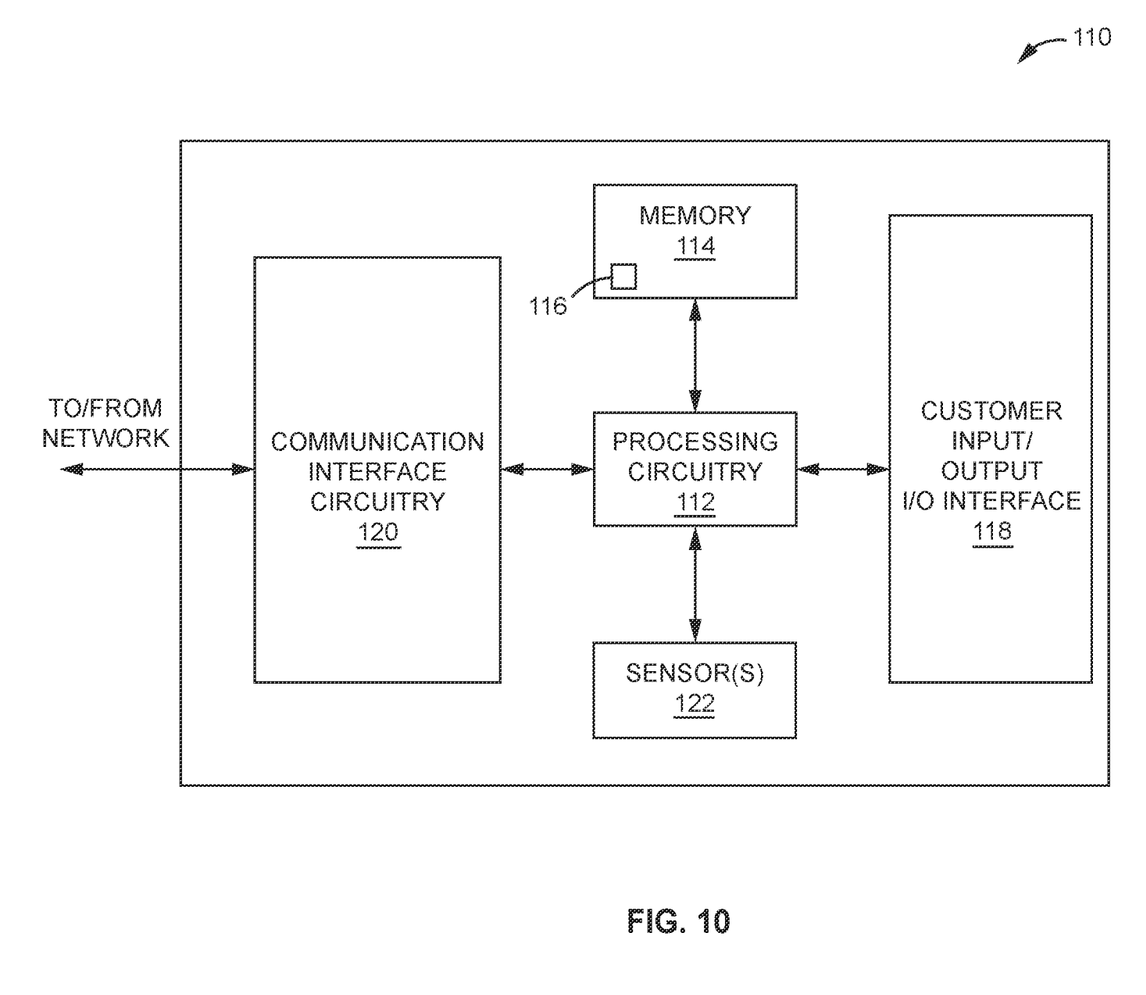
FIG. 10 is a functional block diagram illustrating a computer that configures an SCO station to communicate context information to a user according to one embodiment of the present disclosure.

FIG. 10 is a schematic block diagram illustrating the main functional components of computer 110 according to one embodiment of the present disclosure. As seen in FIG. 10, computer 110 comprises processing circuitry 112, memory 114 storing a control program 116, a user input/output (I/O) interface 118, a communications interface circuit 120, and one or more sensors 122.

Processing circuitry 112 comprises one or more microprocessors, hardware circuits, firmware or a combination thereof. In the exemplary embodiments described herein, processing circuitry 112 is configured to control the operation and functioning of SCO station 10 (and, similarly, SCO kiosk 100). Additionally, processing circuitry 112 is also configured, as previously described, to communicate context information to a user of the SCO station 10. In particular, processing circuitry 112 is configured according to the present embodiments to determine context information associated with a predetermined event, determine user preference information associated with the user of the SCO station, generate control signals to control operation of the plurality of light elements based on the context information and the user preference information, and control the plurality of light elements to communicate the context information to the user according to the control signals.

Memory 114 comprises a non-transitory computer readable medium that stores executable program code and data used by the processing circuitry 112 for operation. In this embodiment, the program code and data comprises a control program 116 that, when executed by processing circuitry 112, configures computer 110 to perform the functions previously described. In some embodiments, control program 116 has access to customer preference information that, as previously described, can be utilized to control the plurality of light elements to communicate the context information to the user. Memory 114 may include both volatile and non-volatile memory, and may comprise random access memory (RAM), read-only memory (ROM), and electrically erasable programmable ROM (EEPROM) and/or flash memory. Additionally or alternatively, memory 114 may comprise discrete memory devices, or be integrated with one or more microprocessors in the processing circuitry 112.

The user I/O interface 118 comprises, in one or more embodiments, one or more input devices and display devices to enable a user, such as a customer or store associate, for example, to interact with and control computer 110. Such devices may comprise any type of device for inputting data into a computing device including, but not limited to, keyboards, number pads, push buttons, touchpads, touchscreens, or voice activated inputs. The display devices that comprise user I/O interface 118 may comprise, for example, a liquid crystal display (LCD) or light emitting diode (LED) display, or a touchscreen display that also functions as a user input device. According to the present disclosure, the user I/O interface 118 also comprises the display device 18, the payment processing unit 22, the printer 24, the cash accepter 26 and the change interface 28.

The communications interface circuit 120 comprises, in one embodiment, a transceiver circuit and/or interface circuit for communicating with remote devices over a communication network or direct communication link. For example, the communications interface circuit 120 may comprise a WiFi interface, a cellular radio interface, a BLUETOOTH interface, an Ethernet interface, or other similar interface for communicating over a communication network or a wireless communication link. Computer 110 may use the communications interface circuit 120, for example, to communicate with a communications network, a database storing customer profiles, other remote computing devices, and one or security cameras covering the area inside the retail store, and the area outside the store in close proximity to the store, as previously described.

The sensors 122 may comprise any sensors known in the art. In these embodiments, however, sensor(s) 122 comprise a non-contact sensor configured to detect when a customer approaches SCO station 10, and to send a signal to processing circuitry 112 indicating the presence of the customer. As stated above, the signal sent by sensor 122 triggers processing circuitry 112 to control light elements 30 according to the present disclosure. In one embodiment, sensor 122 may also comprise a light sensor configured to measure ambient light, and provide signals representing those measurements to processing circuitry 112. In some embodiments, sensor 122 may comprise a camera.

Figure 11:
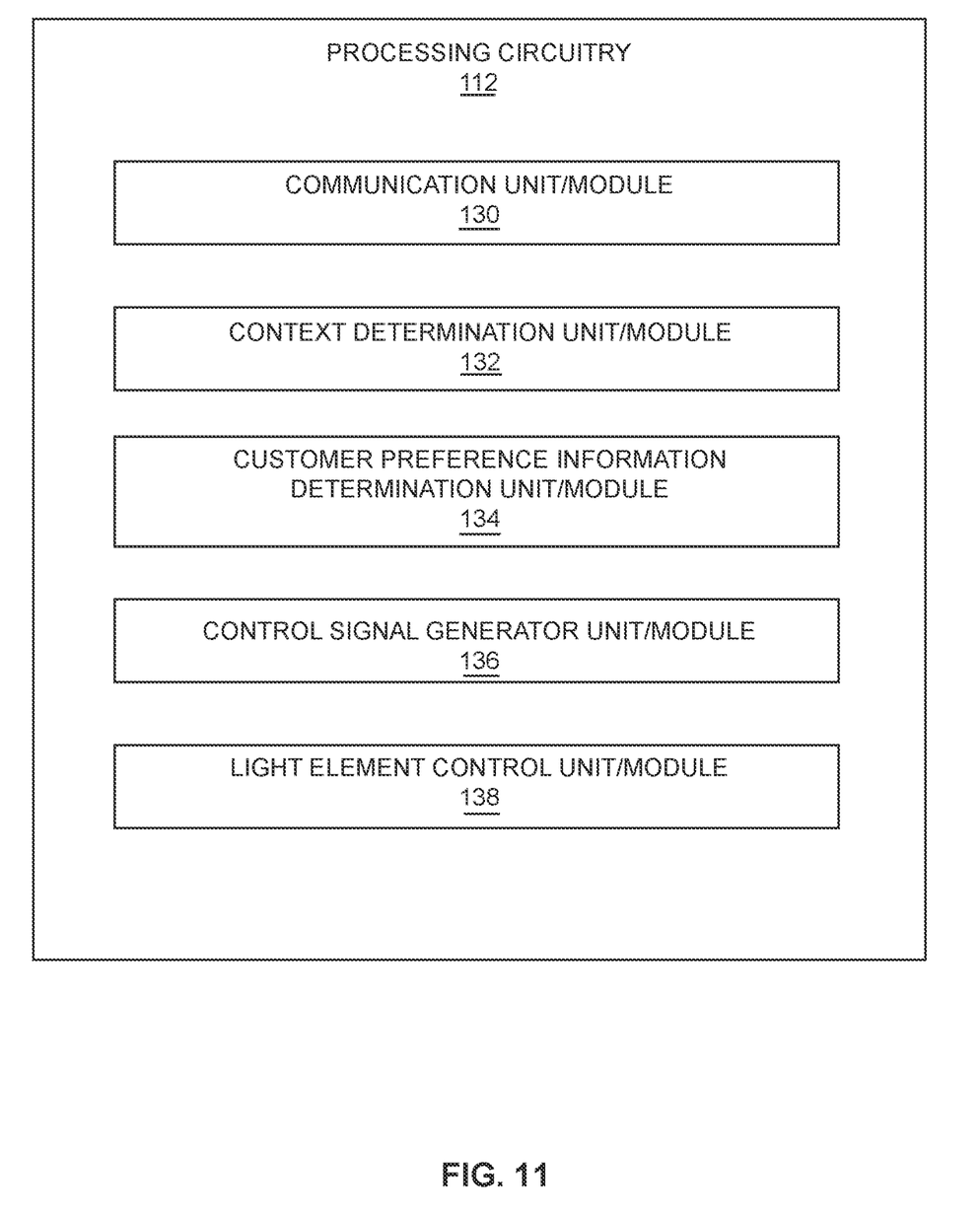
FIG. 11 is a schematic block diagram a computer program product that configures a computer to communicate context information to a user of an SCO station according to one embodiment of the present disclosure.

FIG. 11 is a schematic block diagram illustrating a computer program product, such as control program 116. As stated above, control program 116 comprises executable code that, when executed by processing circuitry 112, causes computer 110 to control one or more of the light elements 30 to communicate context information to a customer, as previously described. As seen in FIG. 11, the control program 116 comprises a plurality of units/modules including a communication unit/module 130, a context determination unit/module 132, a customer preference information determination unit/module 134, a control signal generator unit/module 136, and a light element control unit/module 138.

The communication unit/module 130 comprises program code that is executed by processing circuitry 112 to facilitate communicates with one or more remote devices via a communication network, as well as with the various components of SCO station 10. As stated above, the components include, but are not limited to, the lighting elements 30.

The context determination unit/module 132 comprises program code that is executed by processing circuitry 112 to determine context information associated with a predetermined event. In one embodiment, the contest determination unit/module 132 accomplishes this function by obtaining the context information from a database associated with a retail store.

The customer preference information determination unit/module 134 comprises program code that is executed by processing circuitry 112 to determine the customer's preferences with respect to the light elements 30. Such preference information may be obtained, for example, from the database associated with the retail store.

The control signal generator unit/module 136 comprises program code that is executed by processing circuitry 112 to generate and/or modify the control signals used to control the light elements 30 based on the context information and the customer preference information, as previously described. The light element control unit/module 138 comprises program code that is executed by processing circuitry 112 to control the light elements 30 based on the control signals generated by the control signal generator unit/module 136.

The present embodiments may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A self-checkout (SCO) system in a retail store, the SCO system comprising:
a communication interface circuit configured to communicate with one or more computing devices via a communication network;
a plurality of light elements visible to a user of the SCO system; and
processing circuitry operatively connected to the communication interface circuit and configured to:
determine context information associated with a predetermined event, wherein the context information indicates a particular stage of a self-checkout process and/or an action the user is to perform during the particular stage of the self-checkout process;
determine user preference information associated with the user of the SCO system, wherein the user preference information identifies a medical condition of the user;
generate control signals to control operation of the plurality of light elements based on the context information;
modify the control signals to control the operation of the plurality of light elements according to the medical condition of the user; and
control the plurality of light elements to communicate the context information to the user according to the modified control signals.

2. The SCO system of claim 1:
wherein to generate the control signals, the processing circuitry is configured to generate one or more control parameters based on the context information;
wherein to modify the control signals, the processing circuitry is configured to modify at least one control parameter based on the medical condition of the user; and
wherein the processing circuitry is further configured to control the plurality of light elements to communicate the context information to the user according to the modified at least one control parameter.

3. The SCO system of claim 1 wherein the processing circuitry is configured to control the plurality of light elements according to:
a user preferred color scheme specified in the user preference information; and/or
a user preferred intensity specified in the user preference information.

4. The SCO system of claim 1 wherein the processing circuitry is configured to:
determine a user sensitivity associated with the user based on the user preference information; and
modify the control signals according to the user sensitivity.

5. The SCO system of claim 4 wherein the processing circuitry is configured to modify the control signals to mute an intensity of the plurality of light elements.

6. The SCO system of claim 4 wherein the processing circuitry is configured to modify the control signals to prohibit animating the plurality of light elements.

7. The SCO system of claim 1 wherein the predetermined event is an emergency event, and wherein the processing circuitry is further configured to:
receive a message indicating the emergency event; and
control the operation of the plurality of light elements to indicate the emergency event to the user.

8. The SCO system of claim 1 wherein the processing circuitry is configured to synchronize activation and deactivation of the plurality of light elements to video and/or audio being rendered to the user by the SCO system.

9. The SCO system of claim 1 wherein the SCO system comprises one of:
an SCO terminal;
a cashless SCO kiosk; and
a cash-based SCO kiosk.

10. The SCO system of claim 1 wherein the plurality of light elements comprise a plurality of light banks with each light bank comprising an array of one or more Light Emitting Diodes (LEDs), and wherein each light bank in the plurality of light banks is configured to be controlled independently of the other light banks in the plurality of light banks.

\* \* \* \* \*